United States Patent
Salian

(10) Patent No.: US 11,949,923 B1
(45) Date of Patent: Apr. 2, 2024

(54) TRIGGER BASED DIGITAL CONTENT CACHING

(71) Applicant: Adobe Inc., San Jose, CA (US)

(72) Inventor: Nithesh Gangadhar Salian, Bengaluru (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/067,903

(22) Filed: Dec. 19, 2022

(51) Int. Cl.
*H04N 21/231* (2011.01)
*H04N 21/472* (2011.01)

(52) U.S. Cl.
CPC . *H04N 21/23106* (2013.01); *H04N 21/47205* (2013.01)

(58) Field of Classification Search
CPC ............ H04N 21/23106; H04N 21/47205
See application file for complete search history.

(56) References Cited

U.S. PATENT DOCUMENTS

| | | | | |
|---|---|---|---|---|
| 7,603,683 B2* | 10/2009 | Reto | ............... | H04N 21/47202 709/204 |
| 8,363,102 B1* | 1/2013 | Kadoch | ................. | H04W 4/90 348/148 |
| 8,428,453 B1* | 4/2013 | Spiegel | ................. | H04N 23/62 396/299 |
| 8,437,500 B1* | 5/2013 | Bosworth | ............. | G06V 20/30 715/733 |
| 8,442,265 B1* | 5/2013 | Bosworth | ........ | H04N 21/44008 715/733 |
| 8,631,084 B2* | 1/2014 | Garcia | ............. | G06F 16/24578 709/204 |
| 8,700,708 B2* | 4/2014 | Richter | ................. | G06Q 50/01 709/204 |
| 8,701,020 B1* | 4/2014 | Fulcher | ............. | H04N 21/4788 715/756 |
| 8,732,255 B2* | 5/2014 | Odio | ..................... | G06Q 10/10 709/206 |
| 8,775,972 B2* | 7/2014 | Spiegel | ................ | H04L 67/306 715/833 |
| 8,824,748 B2* | 9/2014 | Tseng | ................. | G06F 16/5838 382/103 |

(Continued)

OTHER PUBLICATIONS

Adobe Inc. , "User Guide Set up cloud documents to use offline", Adobe Inc. [retrieved Oct. 11, 2022]. Retrieved from the Internet <https://helpx.adobe.com/creative-cloud/help/cloud-documents-work-offline.html>., 6 Pages.

(Continued)

*Primary Examiner* — Michael B. Pierorazio
(74) *Attorney, Agent, or Firm* — FIG. 1 Patents

(57) ABSTRACT

Techniques for trigger based digital content caching are described to automatically cache digital content on a client device based on a likelihood that the client device will access the digital content. A cache system, for instance, monitors an interaction of a first client device with digital content that is maintained as part of a digital service by a service provider system. Based on the monitored interaction, the cache system detects a trigger event that indicates a likelihood of interaction by a second client device to edit the digital content. Responsive to detection of the trigger event, the cache system is operable to initiate caching of the digital content on the second client device automatically and without user intervention.

20 Claims, 10 Drawing Sheets

(56) References Cited

U.S. PATENT DOCUMENTS

| | | | | | |
|---|---|---|---|---|---|
| 8,887,203 | B2* | 11/2014 | Kim | | H04N 21/482 725/50 |
| 8,909,725 | B1* | 12/2014 | Sehn | | H04L 51/08 709/206 |
| 8,914,752 | B1* | 12/2014 | Spiegel | | G06F 3/0481 715/256 |
| 8,918,463 | B2* | 12/2014 | Garcia | | G06Q 50/01 709/204 |
| 8,930,837 | B2* | 1/2015 | Walkin | | G06T 11/00 715/764 |
| 8,994,775 | B2* | 3/2015 | Lee | | H04N 7/142 348/14.02 |
| 9,110,981 | B1* | 8/2015 | Hamilton | | G06F 16/958 |
| 9,137,550 | B1* | 9/2015 | Velummylum | | H04W 4/025 |
| 9,143,542 | B1* | 9/2015 | Tseytlin | | A61B 6/00 |
| 9,143,742 | B1* | 9/2015 | Amira | | H04N 7/183 |
| 9,159,364 | B1* | 10/2015 | Matias | | G11B 27/031 |
| 9,183,307 | B2* | 11/2015 | He | | G06F 16/9535 |
| 9,204,101 | B1* | 12/2015 | Sharifi | | H04N 7/17318 |
| 9,253,551 | B1* | 2/2016 | Lewis | | H04N 21/435 |
| 9,286,641 | B2* | 3/2016 | Bosworth | | G06Q 50/01 |
| 9,292,518 | B2* | 3/2016 | Tseng | | G06F 16/435 |
| 2004/0100486 | A1* | 5/2004 | Flamini | | H04N 21/4312 348/E5.103 |
| 2005/0041793 | A1* | 2/2005 | Fulton | | H04M 3/436 379/201.12 |
| 2006/0239648 | A1* | 10/2006 | Varghese | | H04N 21/8456 386/281 |
| 2006/0265668 | A1* | 11/2006 | Rainisto | | G06F 3/0236 715/816 |
| 2007/0124795 | A1* | 5/2007 | McKissick | | H04N 21/252 725/135 |
| 2009/0087161 | A1* | 4/2009 | Roberts | | G11B 27/28 386/285 |
| 2009/0148124 | A1* | 6/2009 | Athsani | | H04N 21/6582 386/241 |
| 2009/0187936 | A1* | 7/2009 | Parekh | | H04N 21/2743 725/25 |
| 2009/0300475 | A1* | 12/2009 | Fink | | H04N 21/4781 726/4 |
| 2010/0053461 | A1* | 3/2010 | Lad | | H04N 21/64322 348/734 |
| 2011/0164105 | A1* | 7/2011 | Lee | | H04N 7/142 348/14.02 |
| 2011/0242122 | A1* | 10/2011 | Bose | | G09G 5/08 345/545 |
| 2011/0249073 | A1* | 10/2011 | Cranfill | | H04N 23/80 348/14.02 |
| 2012/0017241 | A1* | 1/2012 | Yeh | | H04N 21/42214 725/37 |
| 2012/0110611 | A1* | 5/2012 | Seidel | | H04N 21/426 725/28 |
| 2012/0144423 | A1* | 6/2012 | Kim | | H04N 21/482 725/38 |
| 2012/0166964 | A1* | 6/2012 | Tseng | | G06F 3/048 715/745 |
| 2012/0192242 | A1* | 7/2012 | Kellerer | | G06F 16/787 725/116 |
| 2014/0006930 | A1* | 1/2014 | Hollis | | G06Q 50/01 715/234 |
| 2014/0013342 | A1* | 1/2014 | Swan | | H04N 21/4821 725/92 |
| 2014/0129953 | A1* | 5/2014 | Spiegel | | G06F 3/0481 715/741 |
| 2015/0058754 | A1* | 2/2015 | Rauh | | H04N 1/00 715/753 |
| 2015/0100578 | A1* | 4/2015 | Rosen | | G06F 16/907 707/737 |
| 2015/0156226 | A1* | 6/2015 | Hollis | | G06F 3/0482 715/753 |
| 2015/0169747 | A1* | 6/2015 | Hume | | G06F 16/686 704/8 |
| 2015/0213561 | A1* | 7/2015 | Hollis | | G06Q 30/02 705/14.66 |
| 2015/0281562 | A1* | 10/2015 | Ruben | | H04N 23/62 348/220.1 |
| 2015/0288742 | A1* | 10/2015 | Flynn | | G06Q 50/01 709/217 |
| 2015/0350136 | A1* | 12/2015 | Flynn, III | | G06F 3/04842 715/752 |
| 2016/0012853 | A1* | 1/2016 | Cabanilla | | H04L 65/403 386/241 |
| 2016/0078390 | A1* | 3/2016 | Grewal | | G06Q 10/06398 705/7.42 |
| 2018/0176614 | A1* | 6/2018 | Lin | | G11B 27/031 |
| 2019/0259107 | A1* | 8/2019 | Hollis | | H04L 65/403 |
| 2021/0256627 | A1* | 8/2021 | Hollis | | G06F 3/0482 |

OTHER PUBLICATIONS

Snowden, Eric, "Bringing teams together in Creative Cloud at Adobe MAX 2021", Adobe Blog [retrieved Oct. 11, 2022]. Retrieved from the Internet <https://blog.adobe.com/en/publish/2021/10/26/creative-cloud-canvas-spaces-ps-ai-in-browser>., Oct. 26, 2021, 11 Pages.

* cited by examiner

TRIGGER BASED DIGITAL CONTENT CACHING

BACKGROUND

Remote digital content storage (e.g., "cloud-based storage") has been developed to offer increased accessibility and support of collaborative workflows. For example, an instance of digital content that is stored remotely in the cloud is editable by multiple different client devices via a network. To access digital content stored in the cloud, in a conventional scenario a client device submits a request to access the digital content, the digital content is located in its respective storage location and is downloaded by a client device for local interaction. However, there is an inherent delay in presenting the digital content to the user based on the time it takes to locate and download the digital content, especially in instances involving significant amounts of data. This delay can be frustrating to users and reduces the benefits of collaborative workflows associated with remote digital content storage.

SUMMARY

Techniques for trigger based digital content caching are described that support automatic caching of cloud-based digital content on a client device. This is performed based on a likelihood that the client device will access the digital content. In an example, a computing device implements a cache system to monitor an interaction of a first client device with digital content, such as an interaction to edit a digital image. The cache system detects a trigger event based on the monitored interaction that indicates a likelihood of interaction by a second client device to edit the digital content. The trigger event is based on a variety of factors, such as operations of the first client device, features of the digital content, or performance metrics of the first client device. Based on detection of the trigger event, the cache system is operable to initiate caching of the digital content on the second client device, automatically and without user intervention. In this way, the techniques described herein enable predictive caching of digital content based on a variety of considerations to enhance a user experience while conserving computational resources.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
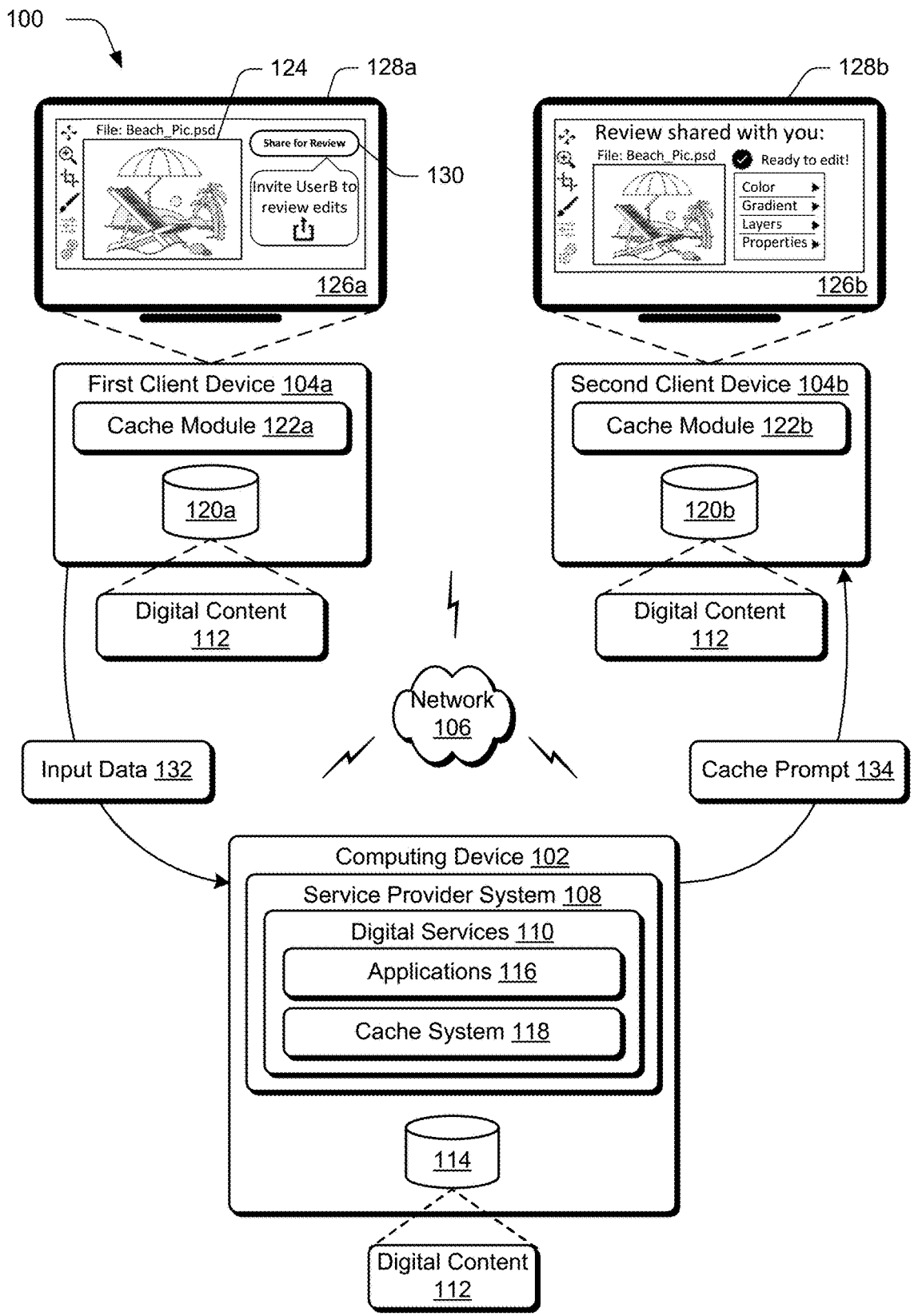
FIG. 1 is an illustration of an environment in an example implementation that is operable to employ trigger based digital content caching techniques as described herein.

Conventional systems for collaborative editing store digital content "in the cloud" such that a variety of devices are able to access the digital content from various locations via a network. Conventional techniques to access the digital content start with a request by a user of a device to access the digital content, which is then located in storage and obtained for presentation to the user, e.g., via a download. Thus, there is an inherent delay in presenting the digital content to the user associated with locating the digital content in storage, downloading the digital content, and presenting it on the user's device. As such, a size of the digital content also has a direct effect on this delay. Some conventional techniques include an option to make cloud-based documents "available offline," however such techniques rely on manual operations by a user to download the digital content, which inhibits otherwise expedient collaborative workflows.

Accordingly, techniques and systems for trigger based digital content caching are described that overcome these challenges by automatically caching cloud-based digital content on a client device based on a likelihood that the client device will access the digital content. Generally, caching enables the digital content or portions of the digital content to be stored in a known location so that requests to access the data can be completed with increased speed and efficiency. The techniques described herein enable digital content to be "pre-cached" such that when a user requests to access the digital content, the digital content is available for interaction without encountering a delay as involved in conventional techniques.

In an example, a computing device implements a cache system to monitor input data that describes an interaction of a first client device with digital content that is maintained as part of a digital service by a service provider system. In this example, consider that the first client device interacts with the digital content to edit a digital image as part of a graphics editing application (e.g., Adobe® Photoshop®) provided by the service provider system. The cache system leverages a variety of the digital services of the service provider system to monitor the interaction, such as commenting services, share for review services, content sharing services, invitation services, centralized digital workspace generation and management services, editing services, performance services, etc. In this way, the cache system leverages existing digital service functionality to track various activities of the first client device as it interacts with the digital content.

Based on the monitored interaction, the cache system detects a trigger event (e.g., a social trigger event) that is indicative of a likelihood of interaction by a second client device with the digital content. The trigger event is detectable based on a variety of considerations such as features of the digital content, performance metrics of the first client device and/or the service provider, operations of the first client device, metadata associated with the first client device and/or second client device, etc. Continuing with the above example, consider that the trigger event includes an action by the first client device to activate a commenting pane of the graphics editing application and generate a user tag in the commenting pane that includes a user identifier associated with the second advice. For instance, the first client device generates a comment in the commenting pane that "mentions" a user of the second client device. Thus, activation of the commenting pane along with generation of the user tag is indicative of a likelihood that the second client device will access the digital content, e.g., to edit the digital image responsive to the comment with the user tag.

Based on detection of the trigger event, the cache system initiates caching of the digital content on the second client device, automatically and without user intervention. In this example, caching the digital image includes configuring the digital image to be editable by the second client device. Accordingly, an editable version of the digital image is cached on the second client device in anticipation of receiving a request from the second client device to access the digital content. In this way, the techniques described herein enable predictive caching of digital content based on a variety of considerations to support efficient access to digital content in collaborative workflows and enhance a user experience.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the trigger based digital content caching techniques described herein. The illustrated environment 100 includes a computing device 102, as well as a plurality of client devices, such as a first client device 104a and a second client device 104b. While in this example two client devices are depicted, this is by way of example and not limitation and implementations including a plurality of client devices, or just a single client device, are contemplated. The computing device 102, the first client device 104a, and the second client device 104b are communicatively coupled via a wired or a wireless connection represented as a network 106.

The computing device 102, the first client device 104a, and the second client device 104b are configurable in a variety of ways, such as a desktop computer, a laptop computer, a mobile device (e.g., assuming a handheld configuration such as a tablet or mobile phone), and so forth. Thus, the computing device 102, the first client device 104a, and/or the second client device 104b range from full resource devices with substantial memory and processor resources (e.g., personal computers, game consoles) to low-resource devices with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as implementing a service provider system 108 that includes digital services 110. In various examples, the service provider system 108 supports interactions between the first client device 104a and/or the second client device 104b with digital content 112, which is illustrated as maintained in storage 114 of the computing device. Accordingly, the digital services 110 support various functionalities to enable such interactions. For instance, the digital services 110 include applications 116 such as a digital image editing application that enables cloud-based collaborative editing of the digital content 112. The digital services 110 further include various cloud-based extensions, components, add-ins, backend services, storage services, etc. to support and track operations included as part of the application 116 such as commenting operations, share for review operations, editing operations, content sharing operations, invitation operations, centralized digital workspace generation and management operations, performance monitoring applications, etc.

The digital services 110 also include a cache system 118. The cache system 118 is implemented at least partially in hardware of the computing device 102 to manage and/or process the digital content 112. Such processing includes storing the digital content 112, configuration of the digital content 112, communication of the digital content 112, and controlling access to the digital content 112. For instance, the cache system 118 is operable to control access to the digital content 112 such that the digital content 112 is partially or wholly storable by the first client device 104a in storage 120a and/or is storable, partially or wholly, in storage 120b of the second client device 104b. In an example, the cache system 118 is implemented by the service provider system 108 to initiate caching of digital content 112 on a client device automatically and without user intervention.

The first client device 104a and the second client device 104b are illustrated as including a cache module 122a and 122b, respectively. The cache modules 122a, 122b are operable to cache the digital content 112 on the first client device 104a and the second client device 104b, e.g., responsive to initiation of caching by the cache system 118. In some examples, the cache modules 122a, 122b are configurable to implement the cache system 118 to perform the same or similar operations as the computing device 102 as further described below.

An example of the functionality of the cache system 118 is shown. In the illustrated example, the first client device 104a interacts with digital content 112 including a digital image 124 named "Beach Pic" in a user interface 126a of a display device 128a. The interaction of the first client device 104a with the digital image 124 includes editing the digital image 124, e.g., using an application 116 such as a digital image editing application to alter visual properties of the digital image 124. The interaction further includes a share for review operation 130 by the first client device 104a to invite the second client device 104b to review the edits to the digital image 124, e.g., as part of a collaborative editing operation supported by the digital image editing application.

The cache system 118 is operable to monitor the interaction of the first client device 104a with the digital content 112. For instance, the cache system 118 receives input data 132 that describes the interaction, which in this example includes editing the digital image 124 as well as the share for review operation 130 to invite the second client device 104b to review the edits to the digital image 124. The cache system 118 detects a trigger event based on the monitored interaction, such as a social trigger event that indicates a likelihood of interaction by the second client device 104b with the digital content 112. In this example, the cache system 118 detects the social trigger event as including the edits made by the first client device 104a as well as the share for review operation 130 to invite the second client device 104b to review the edits.

Responsive to the trigger event, the cache system 118 is operable to initiate caching of the digital content 112 on the second client device 104b automatically and without user intervention. For instance, the cache system 118 generates a cache prompt 134 which is communicated to the cache module 122b of the second client device 104b. The cache module 122b is operable to cache the digital content 112 on the second client device 104b, e.g., in storage 120b of the second client device 104b.

In some examples, the cache system 118 is further operable to configure the digital content 112 in a variety of ways based on factors such as features of the second client device 104b, the type of trigger event detected, characteristics of the digital content 112, etc. The cache system 118, for instance, is employed to configure the digital image 124 for editing by the second client device 104b in a user interface 126b of a display device 128b based on the trigger event including the share for review operation 130 to invite the second client device 104b to review the edits to the digital image 124. In this way, the techniques described herein overcome the limitations of conventional techniques by enabling automatic predictive caching of digital content based on a variety of factors which increases computational and user efficiency.

Further discussion of these and other techniques are included in the following section and shown using corresponding figures.

Trigger Based Digital Content Caching

Figure 2:
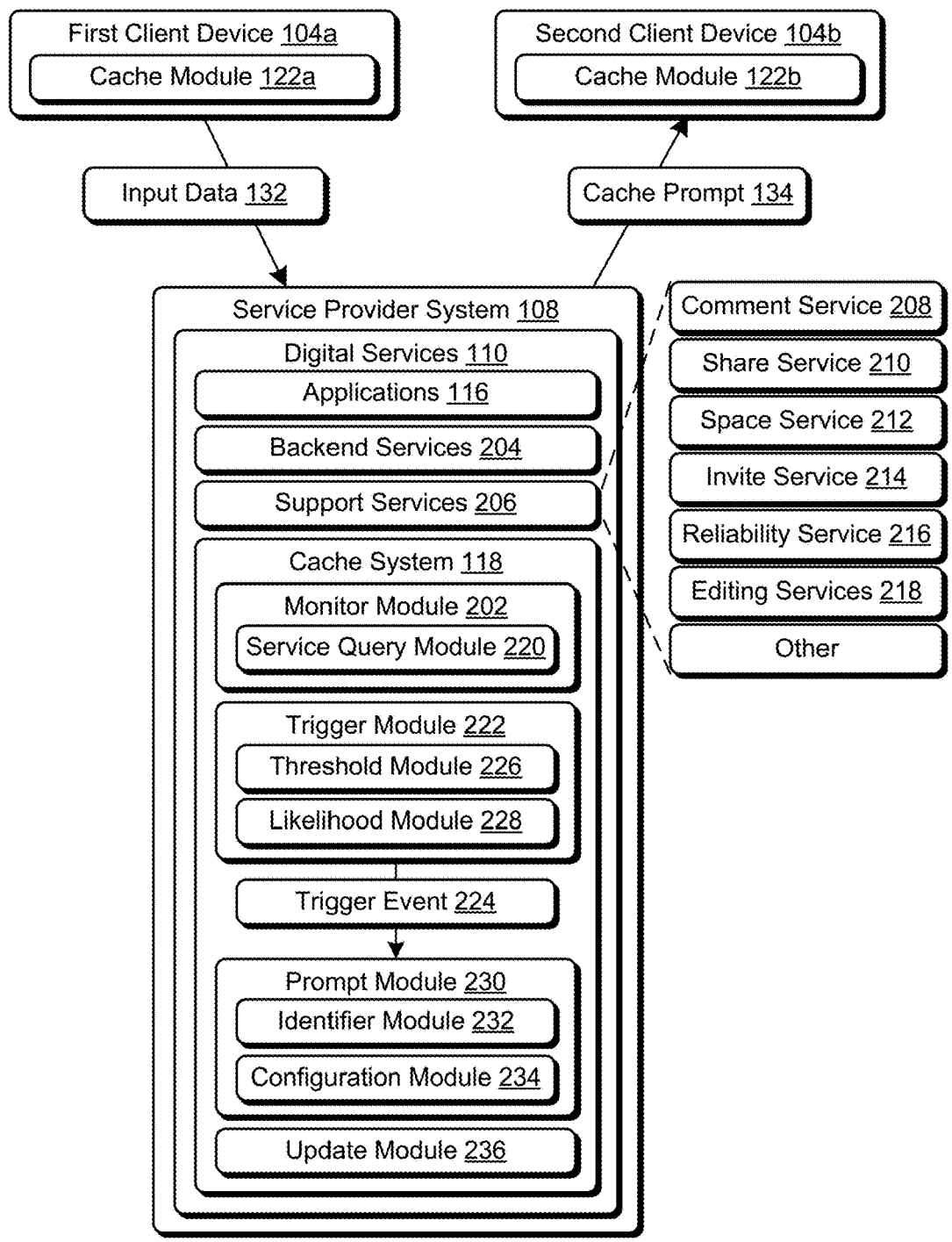
FIG. 2 depicts a system in an example implementation showing operation of a cache system in greater detail.

FIG. 2 depicts a system 200 in an example implementation showing operation of a cache system 118 in greater detail. While in the following example, the cache system 118 is depicted as implemented by the service provider system 108, the same or similar operations are performable by the cache module 122a, 122b, of the first client device 104a and/or second client device 104b respectively. That is, in various embodiments the cache modules 122a, 122b are operable to implement the cache system 118.

To begin in this example, the cache system 118 includes a monitor module 202 that is operable to monitor interaction of a first client device 104a with digital content 112. In some examples, the digital content 112 is maintained locally at the first client device 104a and/or as part of the cache system 118. In additional or alternative examples, the digital content 112 is maintained as part of one or more digital services 110 by a service provider system 108. For instance, the digital services 110 include one or more applications 116, such as cloud-based collaborative applications, and one or more support services 206. A variety of applications 116 are considered, for instance photo editing applications, vector graphics design applications, web design tools, video editing applications, word processing applications, etc.

The digital services 110 further include backend services 204 as well as support services 206 to support various functionalities of the applications 116. In some embodiments, the support services 206 include one or more of a comment service 208 (e.g., to support commenting operations included as part of the applications 116), share service 210 (e.g., to support content sharing operations included as part of the applications 116 such as to share the digital content 112 with the second client device 104b), space service 212 (e.g., to support functionality of a centralized digital workspace to implement features of the applications 116), invite service 214 (e.g., to support invitation operations included as part of the applications 116), reliability service 216 (e.g., to monitor performance metrics of the cache system 118, first client device 104a, second client device 104b and/or various other devices), editing service 218 (e.g., to support and track activities related to various editing operations included as part of the applications such as one or more editing "add-ins"), etc. For instance, the editing service 218 tracks editing operations including frequency of edits, type of edits, scale of edits (e.g., magnitude of edits relative to unedited digital content), length of time to make the edits, time that edits are not being made, etc. Accordingly, the monitor module 202 includes a service query module 220 that is operable to send and receive information to/from the service provider system 108 as part of monitoring an interaction of the first client device 104a. In this way, the cache system 118 is operable to leverage existing functionality of digital services 110 to monitor various activities of the first client device 104a, which is not possible using conventional approaches.

Continuing the above example, the monitor module 202 is operable to monitor the interaction based on input data 132 that is received from a first client device 104a, e.g., via direct interaction with the first client device 104a and/or via the service provider system 108. Generally, the input data 132 describes the interaction of the first client device 104a with digital content 112. In various examples, the input data 132 describes operations of the first client device 104a, properties of the first client device 104a, and/or characteristics of the digital content 112. In an example in which the digital content 112 includes a digital image, the input data 132 describes operations by the first client device 104a to edit the digital image. In an additional or alternative example, the input data 132 describes one or more performance metrics of the first client device 104a such as computational efficiency, as further discussed below. Thus, the monitor module 202 is operable to track a variety of activities related to the interaction of the first client device 104a with the digital content 112.

Based on the monitored interaction, a trigger module 222 of the cache system 118 detects a trigger event 224 such as a social trigger event that is indicative of a likelihood of interaction by another entity. The trigger event 224 indicates a likelihood of use of the second client device 104b to edit the digital content 112. Detection of the trigger event 224 is based on a variety of considerations such as features of the digital content 112, performance metrics of the first client device 104a and/or the service provider system 108, operations of the first client device 104a, metadata associated with the first client device 104a and/or second client device 104b, specified preferences of the first client device 104a and/or the second client device 104b, etc.

For instance, the trigger event 224 is based in whole or in part on operations of the first client device 104a such as one or more of generation of an invitation to another client device, generation of a user tag including a user identifier associated with another client device, generation of a centralized digital workspace, invitation to join a centralized digital workspace, performance of a share for review operation, etc. In one example, the trigger event 224 is based on editing operations of the first client device 104a, such as detecting a particular type of edits made by the first client device 104a to the digital content 112. For instance, the monitor module 202 leverages the editing service 218 to detect a particular type of edit by the first client device 104a such as an edit to add text to a digital image included in the digital content 112. In this example, the edit to add text indicates a likelihood of subsequent edits to the digital content 112 by the second client device 104b and thus the trigger module 222 detects the trigger event 224 as including the edit to add text. In various examples, edit actions that constitute a trigger event 224 are predefined (e.g., automatically and without user intervention or by the first client device 104a and/or the second client device 104b) thus supporting a variety of customizable collaborative editing workflows.

In some examples, the trigger event 224 is based on features of the digital content 112, such as visual features detected using text and/or image recognition, inclusion of embedded documents and/or linked cloud documents, metadata associated with the digital content indicating ownership and/or editing history, etc. By way of example, the trigger event 224 includes a detection that the second client device 104b is an author of the digital content 112. Thus, the digital content 112 that the second client device 104b is an author of is cached automatically and without user intervention on the second client device 104b such that the second client device 104b is able to view and/or edit the digital content.

In another example, the trigger event 224 is based on detection of a particular object or feature as included in the digital content 112. Consider a collaborative editing scenario in which a user of the first client device 104a and a user of a second device work together to edit digital images maintained as part of a digital content editing application by the service provider system 108. The first user is responsible for edits to human likenesses included in the digital images, and the second user is responsible for edits to landscape features. In this example, the user of the first client device 104a begins editing a particular digital image. Accordingly, the trigger module 222 is operable to detect a trigger event 224 that includes the presence of landscape features in the digital image, e.g., one or more trees. Accordingly, the digital image is cached automatically and without user intervention on the second client device 104b in anticipation of interaction by the second client device 104b to edit the particular digital image, e.g., to edit the landscape features.

In some examples, the trigger event 224 is based on one or more performance metrics of the first client device 104a and/or the service provider system 108. For instance, the trigger module 222 includes a threshold module 226 that is operable to detect a trigger event 224 based on whether one or more performance metrics are below and/or above a threshold value. Performance metrics, for instance, include computational resource consumption (e.g., CPU, RAM, ROM use, etc.), network resource consumption, storage capacity, hardware activity, occurrences of operational failures, speed of operations, etc. In one example, the performance metrics include a reliability metric based on successful execution of one or more operations performed by the client device to interact with the digital content 112, such as one or more create, read, update, and/or delete operations. The threshold module 226 is operable to detect a trigger event 224 that includes the reliability metric falling below a threshold value. In this way, the digital content 112 can be cached on an additional device, such as the second client device 104b, responsive to detection that the first client device 104a is experiencing technical issues and/or poor reliability. Further examples and expanded discussion of trigger events 224 are discussed below in greater detail with respect to FIGS. 3-7.

In some implementations, the trigger events 224 are definable in advance, e.g., user defined to support customizable workflows or defined automatically without user intervention. In one or more examples, the trigger module 222 includes a likelihood module 228 that is operable to calculate a likelihood of interaction with the digital content 112 by a second client device 104b. In various implementations, the likelihood module 228 calculates the likelihood based on metadata associated with the first client device 104a and/or the second client device 104b. For instance, the likelihood is based on demographic data associated with a user identifier associated with the second client device 104b, previous operations of the second client device 104b to access the digital content 112, and/or global data indicative of a likelihood of access by a variety of client devices.

In an example, the likelihood module 228 leverages a machine learning model such as a neural network to calculate the likelihood. The machine learning model is configurable to consider a variety of factors to determine a likelihood of interaction, such as demographic data associated with one or more users of the first client device 104a and/or the second client device 104b, previous activities of the second client device 104b to access the digital content 112, and/or global data indicative of a likelihood of access by a variety of client devices as described above. The likelihood module 228, for instance, is trained using data that describes past interactions that did or did not result in subsequent access by another client device. Thus, tuning of the machine learning model is usable to recognize patterns in this user interaction and a likelihood that those patterns result in subsequent access by another device. The tuning of the machine learning model is also usable to identify a particular client device that is to be employed for that access. In this way, the likelihood module 228 supports intuitive and accurate prediction of trigger events 224 that are likely to cause interaction by the second client device 104b.

Based on detection of the trigger event 224, the cache system 118 is operable to initiate caching of the digital content 112, e.g., on the second client device 104b. In an example, a prompt module 230 is employed to generate and communicate a cache prompt 134 to the second client device 104b. The cache prompt 134 is operable to cause the digital content 112 to be cached on the second client device 104b, e.g., by leveraging hardware and software operations of the cache module 122b of the second client device 104b to cache the digital content 112. Generally, caching includes storing the digital content 112 in a high-speed data storage layer to increase data retrieval performance. In an example in which the digital content 112 includes embedded and/or linked digital content (e.g., linked cloud documents and/or images), caching involves caching the embedded and or linked digital content on one or more of the first client device 104a or the second client device 104b.

In some examples, the prompt module 230 includes an identifier module 232 that is configured to identify a client identifier associated with the at least one other entity, e.g., the second client device 104b. The identifier module 232 is further operable to identify a plurality of client devices associated with the client identifier and determine a primary client device from the plurality of client devices. In various examples, the primary client device is determined based on usage data of the plurality of client devices (e.g., frequency of use, time of use, length of use, type of usage, applications accessed, operations performed, etc.), hardware capabilities of the plurality of client devices, user defined preferences, etc.

In one example, the primary client device is determined as having hardware capabilities that support efficient editing of the digital content 112 in a particular application 116. In another example, the primary client device is determined based on frequency of use, e.g., a client device of the plurality of client devices with frequent use. In yet another example, the primary client device is determined as a most recent client device of the plurality of computing devices to access a particular digital service 110 of the service provider system 108, e.g., a most recent client device to utilize a content editing application to edit the digital content 112. Thus, the prompt module 230 is operable to deliver the cache prompt 134 to the primary client device such that the digital content 112 is cached on a client device likely to access the digital content 112. Further, in some examples the prompt module 230 delivers the cache prompt 134 to multiple client devices associated with the client identifier such that the digital content 112 is available on multiple devices. In an example, this includes generating a ranked list of the plurality of client devices based on a likelihood of interacting with the digital content 112 and communicating the cache prompt 134 based on the ranked list.

The prompt module 230 also includes a configuration module 234 that is operable to configure the digital content 112 in a variety of ways based on factors including but not limited to properties of the second client device 104b, the type of trigger event detected, characteristics of the digital content 112, and/or one or more organizational classifiers of a client identifier associated with the second client device 104b. For instance, the configuration module 234 configures the digital content 112 to be editable by the second client device 104b based on a trigger event 224 that indicates that the second client device 104b is likely to edit the digital content 112, such as a trigger event 224 that includes an invitation to edit the digital content 112. In another example, the configuration module 234 configures the digital content 112 based on what type of device the second client device 104b is. In an example in which the second client device 104b is a mobile device, the configuration module 234 configures the digital content 112 for display and interaction by a mobile device.

In another example, the configuration module 234 is operable to identify a client identifier associated with the second client device 104b and determine an organizational classifier associated with the client identifier. The organizational classifier, for instance, indicates permission levels to view and/or edit the digital content 112. By way of example, an organizational classifier associated with the second client device 104b indicates that the second client device 104b is privileged to edit the digital content 112. Thus, the configuration module 234 is operable to configure the digital content 112 to be editable by the second client device 104b.

In another example, an organizational classifier associated with the second client device 104b indicates that the second client device 104b is limited to view the digital content 112. Accordingly, in this example the configuration module 234 configures the digital content 112 to be viewed by the second client device 104b but not edited. Further, as described in more detail below with respect to FIG. 6, the configuration module 234 is further operable to enable and/or disable various features of an application 116 to interact with the digital content 112, for instance based on the organizational classifier.

In some examples, the prompt module 230 is operable to determine whether a client device such as the second client device 104b is "opt-ed in" for automatic caching. For instance, in response to a determination that the second client device 104b has opted-in for automatic caching, the prompt module 230 is operable to generate and communicate a cache prompt 134 in accordance with the techniques described above. However, in response to a determination that the second client device 104b is not opted-in, the prompt module 230 restricts communication of the cache prompt 134 to the second client device 104b. In this example, the prompt module 230 is further operable to generate a query for the second client device 104b, e.g., a notification for display in a user interface 126b of the second client device 104b that invites the second client device 104b to opt-in, e.g., to receive the cache prompt 134. The prompt module 230 is operable to receive a response to the query, and responsive to an action by the second client device 104b to opt-in, the prompt module 230 is operable to initiate caching on the second client device 104b in accordance with the techniques described above.

The cache system 118 further includes an update module 236 that is operable to update the cached digital content 112. In an example, the cached digital content 112 includes a digital image that receives subsequent edits by the first client device 104a and/or the second client device 104b. The update module 236 updates the digital image with the subsequent edits as the subsequent edits are received. In one example, the update module 236 does so by generating additional cache prompts to initiate caching of the edited digital content 112 on the first client device 104a and/or the second client device 104b. The update module 236 is further operable to remove cached digital content 112 from the first client device 104a and/or the second client device 104b, e.g., responsive to a determination that further interaction with the digital content 112 is unlikely. For instance, the update module 236 "clears the cache" to conserve storage resources. In this way, automatic caching is performed dynamically to continuously update the digital content 112 for access by the first client device 104a and the second client device 104b to enhance a collaborative user experience.

In some implementations, the prompt module 230 is operable to determine a particular time, location, and/or circumstance to initiate caching to reduce consumption of computational resources. For instance, the prompt module 230 determines a time (e.g., time of day, week, month, year) that the second client device 104b is likely to interact with the digital content based on the trigger event 224. In some examples, the configuration module is operable to leverage a machine learning model, for instance the machine learning model as described above, to determine a predicted interaction time that the second client device 104b will interact with the digital content 112.

Thus, the prompt module 230 is operable to initiate caching prior to the predicted interaction time. For instance, the prompt module 230 determines a particular time before the predicted interaction time that the second client device 104b is not in use to initiate caching to conserve computational resources. In another example, the prompt module 230 initiates caching once the second client device 104b is connected to a reliable network, and thus mitigate the risk of failed caching operations. Accordingly, the techniques described herein overcome conventional limitations to enable predictive caching of digital content based on a variety of considerations to enhance a user experience while simultaneously conserving computational resources.

Figure 3:
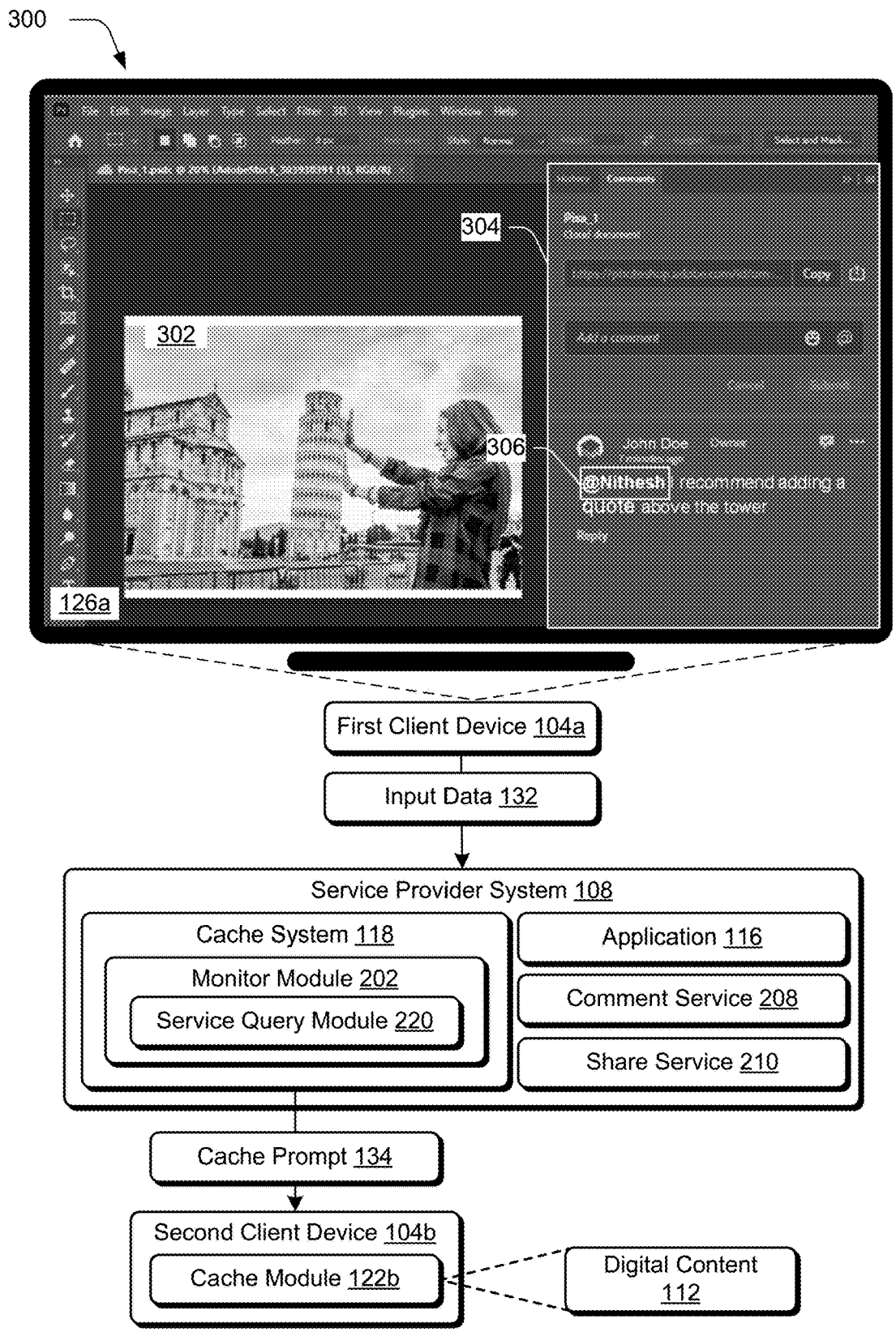
FIG. 3 depicts an example of trigger based digital content caching in which the trigger event includes generation of a user tag.

FIG. 3 depicts an example 300 of trigger based digital content caching in which the trigger event includes generation of a user tag. As illustrated, a user interface 126a of a first client device 104a displays an interaction between the first client device 104a and digital content 112. In this example, the digital content 112 includes a digital image 302. The interaction of the first client device 104a with the digital image 124 includes editing the digital image 124, e.g., using an application 116 such as a cloud-based digital image editing application provided by the service provider system 108. The interaction also includes an operation by the first client device 104a to invite the second client device 104b to edit the digital content 112. The interaction further includes activating a commenting pane 304 of the digital image editing application and generating a user tag 306 in the commenting pane that includes a client identifier associated with the second client device 104b. For instance, the user tag 306 mentions a user of the second client device 104b.

In accordance with the techniques described herein, a monitor module 202 of the cache system 118 is operable to monitor this interaction, for instance via input data 132 received from the first client device 104a. In some examples, the monitor module 202 leverages a service query module 220 to obtain the input data 132 from one or more digital services 110 of the service provider system 108 such as via a comment service 208 and/or a share service 210. The comment service 208, for instance, supports cloud-based comment features of the application 116 such as implemented by the commenting pane 304. The share service 210 supports cloud-based sharing operations of the application 116.

Based on the monitored interaction, the cache system 118 is operable to detect a trigger event 224, which in this example includes the operations by the first client device 104a to invite the second client device 104b to edit the digital image 302, activate a commenting pane 304 of the digital image editing application, and generate the user tag 306 in the commenting pane. Responsive to this trigger event 224, the cache system 118 initiates caching of the digital content 112 on the second client device 104b, for instance by generating a cache prompt 134 and communicating the cache prompt 134 to a cache module 122b of the second client device 104b. Thus, the digital content 112 is cached automatically and without user intervention on the second client device 104b responsive to the invitation to edit the digital content and generation of the user tag 306 in the commenting pane 304.

Figure 4:
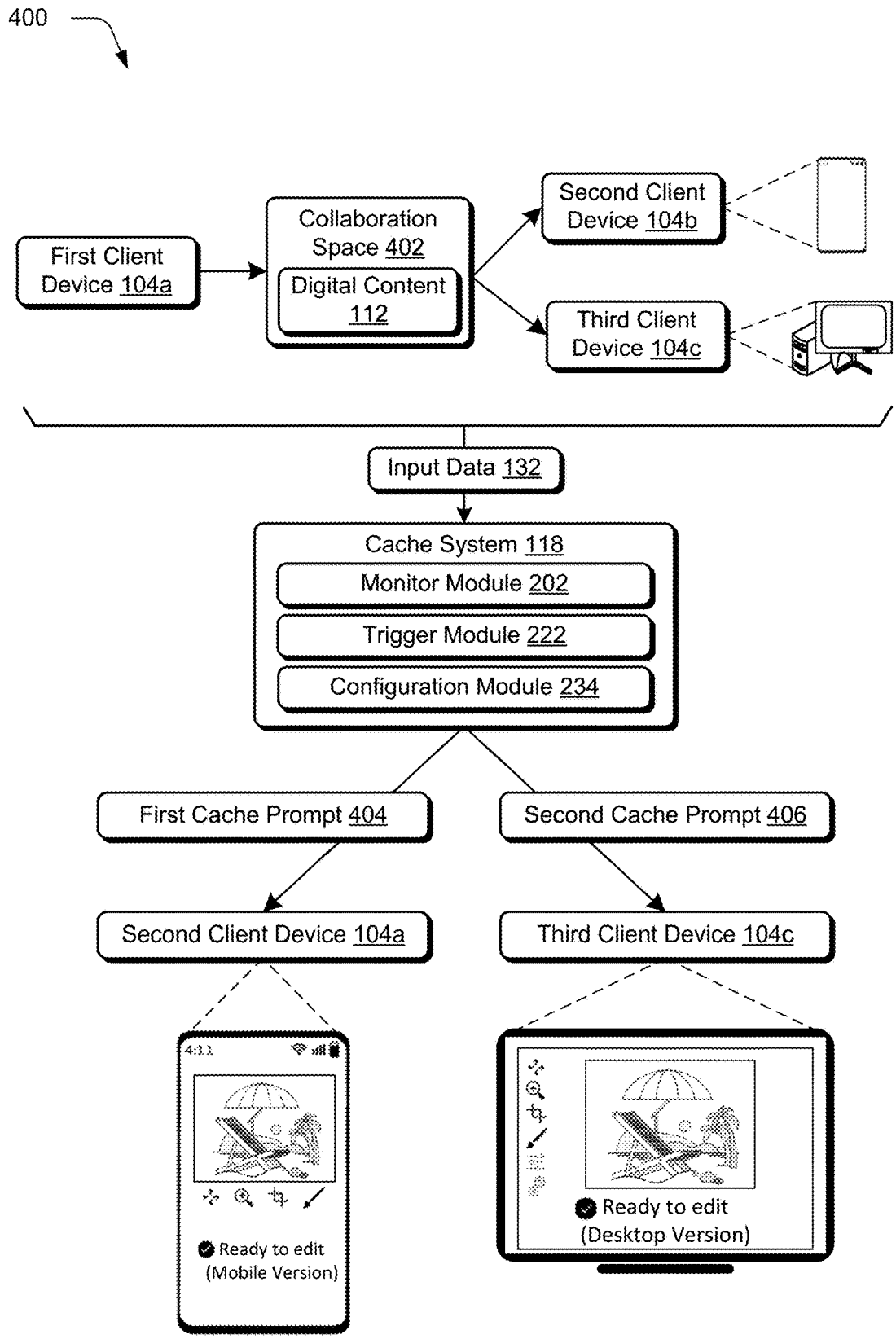
FIG. 4 depicts an example of trigger based digital content caching in which the trigger event includes initialization of a centralized digital workspace.

FIG. 4 depicts an example 400 of trigger based digital content caching in which the trigger event includes initialization of a centralized digital workspace. In this example, an interaction of a first client device 104a with digital content 112 includes initializing a centralized digital workspace such as a collaboration space 402. Generally, the collaboration space 402 is a cloud-based "shared space" to enable collaborative editing of the digital content 112. For instance, multiple instances of digital content 112 are able to be added to the collaboration space 402 to be edited by a variety of entities and devices. The interaction further includes an operation by the first client device 104a to invite a second client device 104b as well as a third client device 104c to edit the digital content 112. In this example, the second client device 104b is a mobile device, e.g., a smartphone, and the third client device 104c is a desktop computer.

A monitor module 202 of the cache system 118 is operable to monitor this interaction, for instance via input data 132 received from the first client device 104a. Although not depicted, in some examples the monitor module 202 leverages a service query module 220 to obtain the input data 132 from the service provider system 108, such as via a space service 212 and/or an invite service 214. The space service 212 supports operations of the collaboration space 402 and the invite service 214 supports invitation operations, such as generation of invites to the collaboration space 402.

Based on the monitored interaction, a trigger module 222 of the cache system 118 is operable to detect a trigger event 224, which in this example includes the operations by the first client device 104a to initialize the collaboration space 402 as well as to invite the second client device 104b and the third client device 104c to join the collaboration space 402 to edit the digital content 112. Responsive to this trigger event 224, the cache system 118 initiates caching of the digital content 112 on the second client device 104b and the third client device 104c in accordance with the techniques described above by generating a first cache prompt 404 to communicate to the second client device 104b and a second cache prompt 406 to communicate to the third client device 104c.

Further, in this example a configuration module 234 of the cache system 118 is operable to configure the digital content 112 based on the type of trigger event 224 detected as well as properties of the second client device 104b and the third client device 104c, respectively. For instance, the trigger event 224 in this example includes generation of an invite to the second client device 104b and the third client device 104c to edit the digital content 112 as part of the collaboration space 402. Thus, the configuration module 234 configures the digital content 112 to be editable by the second client device 104b and the third client device 104c. The configuration module 234 is further operable to configure the digital content 112 based on the type of device. Thus, the configuration module 234 configures the digital content to be compatible with a mobile device for the second client device 104b, and compatible with a desktop computer for the third client device 104c. Accordingly, the digital content 112 is cached automatically and able to be edited by the second client device 104b and the third client device 104c responsive to the invitation to the collaboration space 402.

Figure 5:
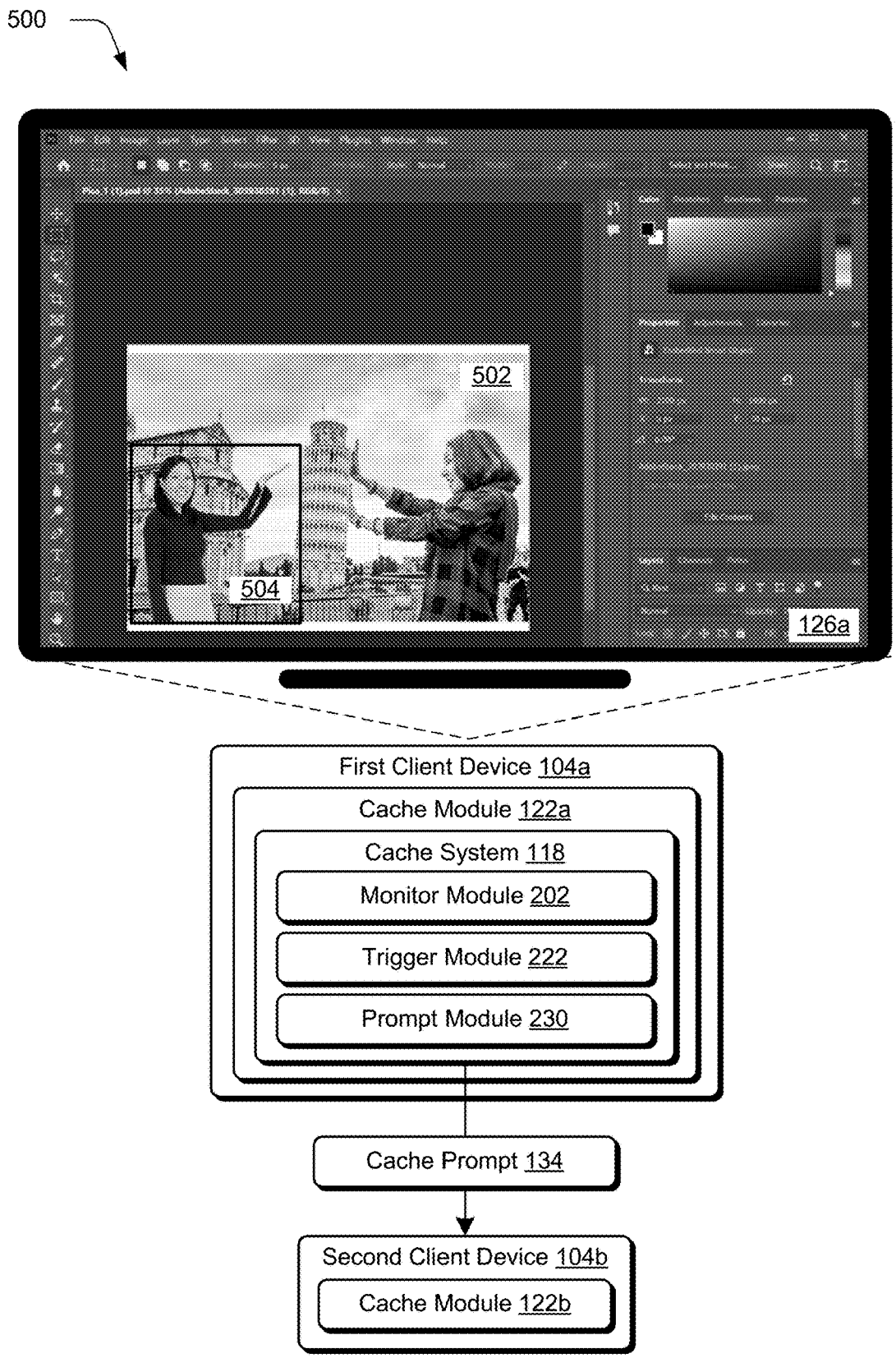
FIG. 5 depicts an example of trigger based digital content caching wherein the trigger event is based on features of the digital content.

FIG. 5 depicts an example 500 of trigger based digital content caching wherein the trigger event is based on features of the digital content. In this example, the cache system 118 is implemented by the cache module 122a of the first client device 104a. A monitor module 202 of the cache system 118 is operable to monitor an interaction of the first client device 104a with digital content 112, for instance via a user interface 126a of the first client device 104a. In this example, the digital content 112 includes a digital image 502 and an embedded digital image 504, e.g., the woman with her left hand raised. The embedded digital image 504 was not originally part of the digital image 502 but rather has been added by editing operations of the first client device 104a.

Based on the monitored interaction and the digital content 112, a trigger module 222 of the cache system 118 is operable to detect a trigger event 224. In this instance, trigger event 224 includes detection of the embedded digital image 504, e.g., using image feature recognition techniques and/or based on an edit history of the digital content 112.

Accordingly, the cache system 118 is operable to initiate caching of the embedded digital image 504 on a second client device 104b in accordance with the techniques described above, for instance via generation of a cache prompt 134 by a prompt module 230 to be communicated to the second client device 104b. Further, in this example the cache system 118 is operable to initiate caching of the embedded digital image 504 on the first client device 104a automatically and without user intervention based on detection of the embedded digital image 504 as part of the digital image 502. Thus, the first client device 104a and the second client device 104b are able to access the embedded digital image 504 without delays that are associated with conventional techniques.

Figure 6:
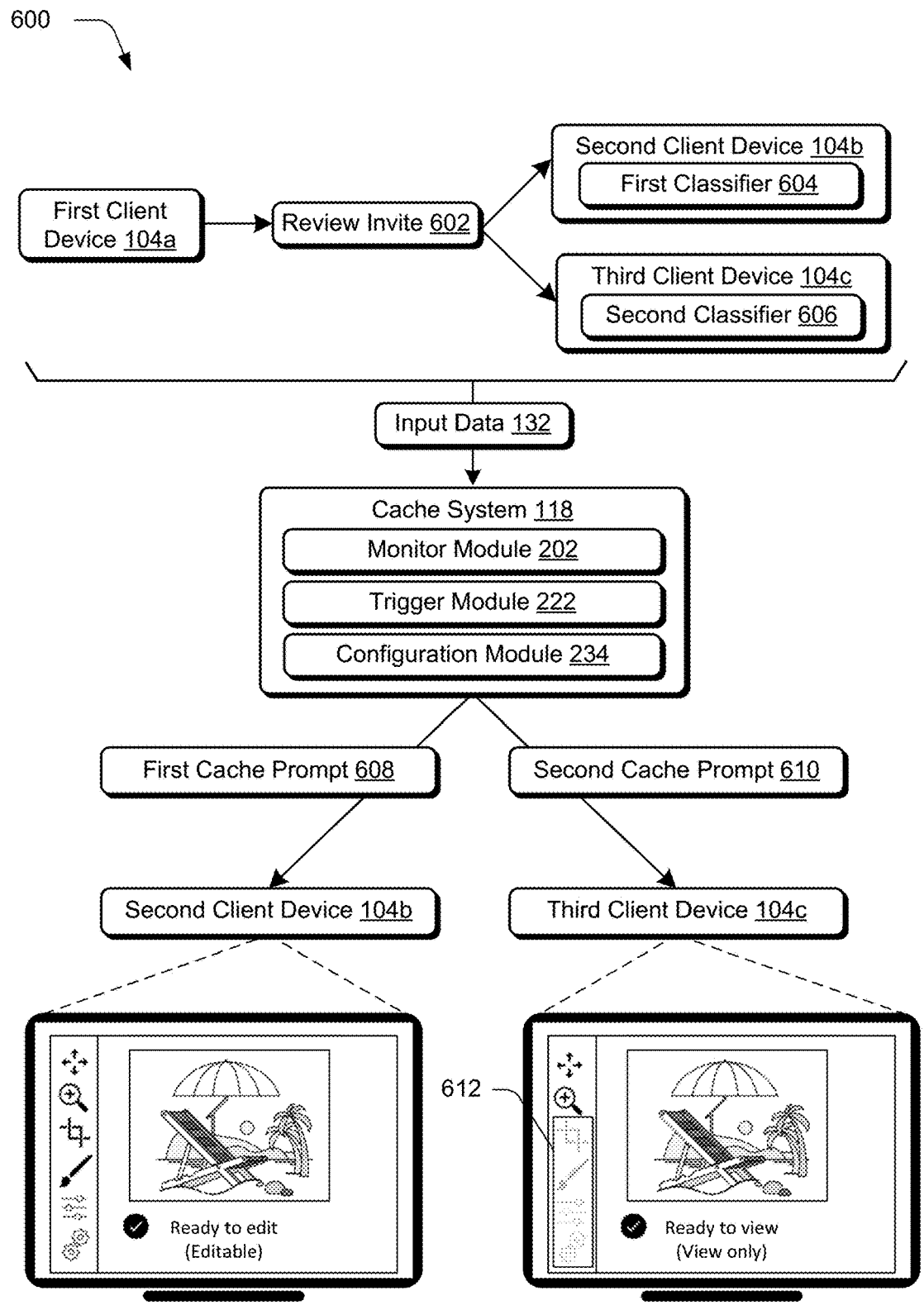
FIG. 6 depicts an example of trigger based digital content caching in which the trigger event includes a share for review operation.

FIG. 6 depicts an example 600 of trigger based digital content caching in which the trigger event includes a share for review operation. The first client device 104a in this example generates a review invite 602 to invite a second client device 104b and a third client device 104c to review the digital content 112. Further, in this example the second client device 104b is associated with a first classifier 604 and the third client device 104c is associated with a second classifier 606. Generally, the first classifier 604 and second classifier 606 indicate permission levels related to the digital content, for instance based on an organizational role, project designation, job qualifications, etc.

A monitor module 202 of the cache system 118 is operable to monitor this interaction, for instance via input data 132 received from the first client device 104a. Although not depicted, in some examples the monitor module 202 leverages a service query module 220 to obtain the input data 132 from a service provider system 108, such as via a share service 210 and/or an invite service 214. The share service 210, for instance, supports content sharing operations and the invite service 214 supports invitation operations, such as invites generated to review the digital content 112.

Based on the monitored interaction, a trigger module 222 of the cache system 118 detects a trigger event 224, which in this example includes the operations by the first client device 104a to generate the review invite 602 to the second client device 104b and the third client device 104c. Responsive to detection of this trigger event 224, the cache system 118 initiates caching of the digital content 112 on the second client device 104b and the third client device 104c, for instance by generating a first cache prompt 608 to communicate to the second client device 104b and a second cache prompt 610 to communicate to the third client device 104c. Further, although not depicted in this example, in some implementations the cache system 118 is leveraged to determine a user identifier associated with the first client device 104a, identify at least one additional device associated with the user identifier, and cause the digital content 112 to be cached on the at least one additional device in anticipation of receiving a review from the second client device 104b and/or the third client device 104c.

In this example, a configuration module 234 of the cache system 118 is operable to configure the digital content 112 based on the first classifier 604 and the second classifier 606. The first classifier 604 and the second classifier 606 are configurable as organizational classifiers that indicate permission levels to view and/or edit the digital content 112. By way of example, the first classifier 604 indicates that the second client device 104b is privileged to edit the digital content 112, for instance as part of the review to make changes to the digital content 112. Accordingly, the configuration module 234 configures the digital content 112 for editing by the second client device 104b.

The second classifier 606, however, indicates that the third client device 104c has privileges sufficient to view the digital content 112, but not make edits to the digital content 112. Thus, the configuration module 234 is operable to configure the digital content 112 such that the third client device 104c is able to view the digital content without making edits. For instance, the configuration module 234 is operable to disable various features 612 of an application 116 to interact with the digital content 112. That is, features 612 that support editing operations are restricted to the third client device 104c. Accordingly, the techniques described herein enable caching of variable digital content automatically and without user intervention based on organizational classifiers which supports a variety of customizable workflows.

Figure 7:
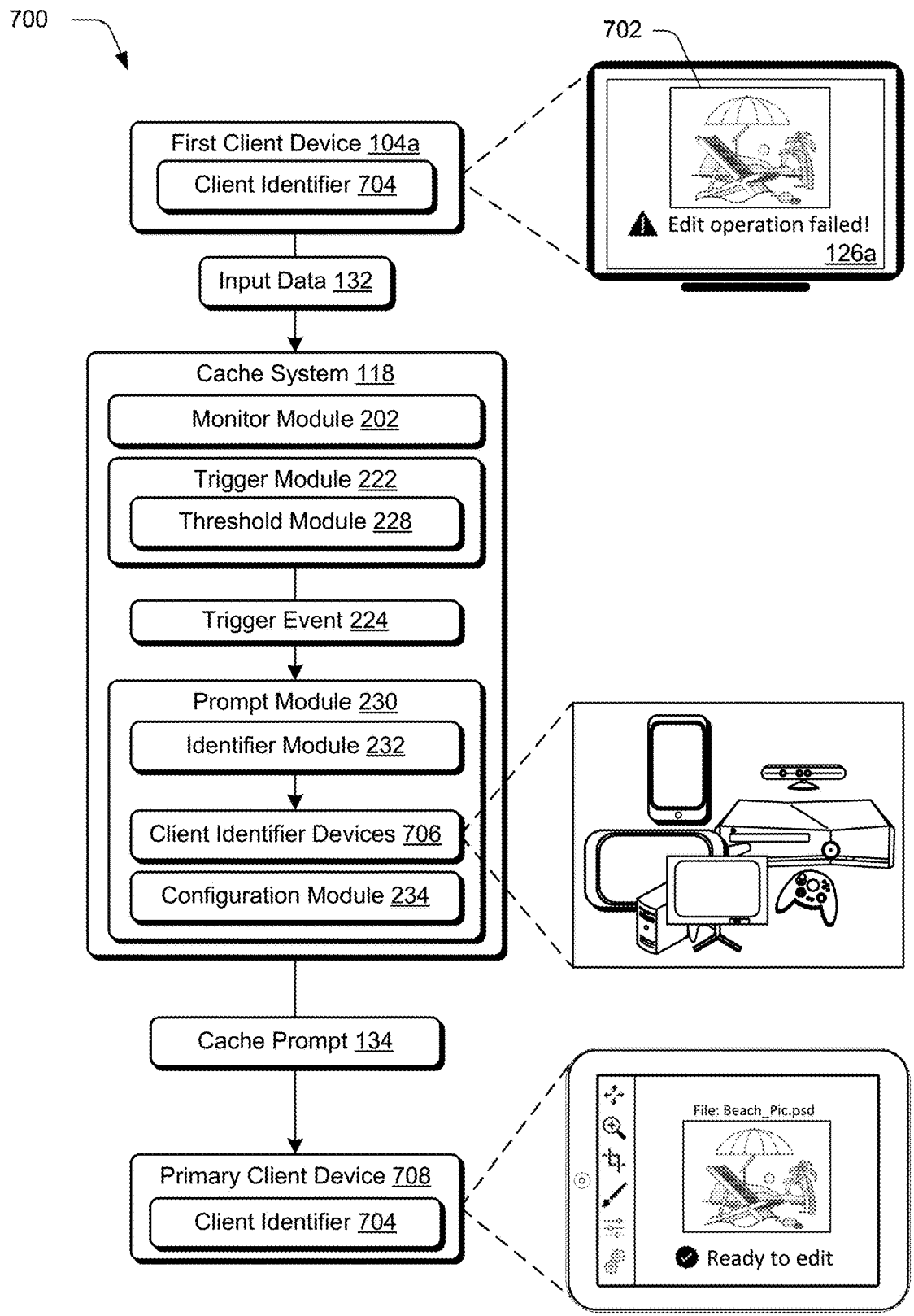
FIG. 7 depicts an example of trigger based digital content caching in which the trigger event is based on one or more performance metrics.

FIG. 7 depicts an example 700 of trigger based digital content caching in which the trigger event is based on one or more performance metrics. In this example, an interaction of a first client device 104a associated with a client identifier 704 with digital content 112 includes editing a digital image 702. However, as depicted in a user interface 126a of the first client device 104a, the edit operation is unsuccessful. A monitor module 202 of the cache system 118 monitors this interaction, for instance via input data 132 received from the first client device 104a. In this example, the input data 132 describes one or more performance metrics of the first client device 104a, such as computational resource consumption (e.g., CPU, RAM, ROM use, etc.) network resource consumption, storage capacity, occurrences of operational failures (e.g., create, read, update, delete, operations), etc. Although not depicted, in some examples the monitor module 202 leverages a service query module 220 to obtain the input data 132 from a service provider system 108, such as via a reliability service 216. The reliability service 216, for instance, monitors performance metrics of the first client device 104a.

Based on the monitored interaction, a trigger module 222 is operable to detect a trigger event 224 that indicates insufficient computational performance by the first client device 104a. For instance, the trigger module 222 includes a threshold module 226 that is operable to determine that one or more of the performance metrics are below a threshold, and the trigger event 224 is based on the performance metrics being below the threshold. Responsive to detection of the trigger event 224, an identifier module 232 determines the client identifier 704 associated with the first client device 104a. Additionally, the identifier module 232 is employed to identify at least one additional client device associated with the client identifier 704, depicted in this example as client identifier devices 706. In some examples, a prompt module 230 initiates caching on all client identifier devices 706, as well as the first client device 104a, such that the digital content 112 is available for editing on a plurality of devices by a user associated with the client identifier 704.

However, in the illustrated example, the identifier module 232 determines a primary client device 708 from the client identifier devices 706. For instance, the primary client device 708 is selected as a reliable client device unlikely to experience failed editing operations, e.g., based on hardware capabilities of the client identifier devices 706. Accordingly, the prompt module 230 is operable to initiate caching of the digital content 112 on the primary client device 708 in accordance with the techniques described above. For instance, initiating caching includes generation of a cache prompt 134 to communicate to the primary client device 708. Additionally, a configuration module 234 of the cache system 118 is further operable to configure the digital content 112 to be editable by the primary client device 708. Thus, responsive to a determination that a first client device 104a is experiencing difficulties such as failed editing operations, the techniques described herein enable the digital content 112 to be cached automatically and without user intervention on another client device. In this way, the techniques described herein enable the additional client device to edit the digital content 112 without the delays associated with conventional techniques, and further prevent a loss of content.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

Figure 8:
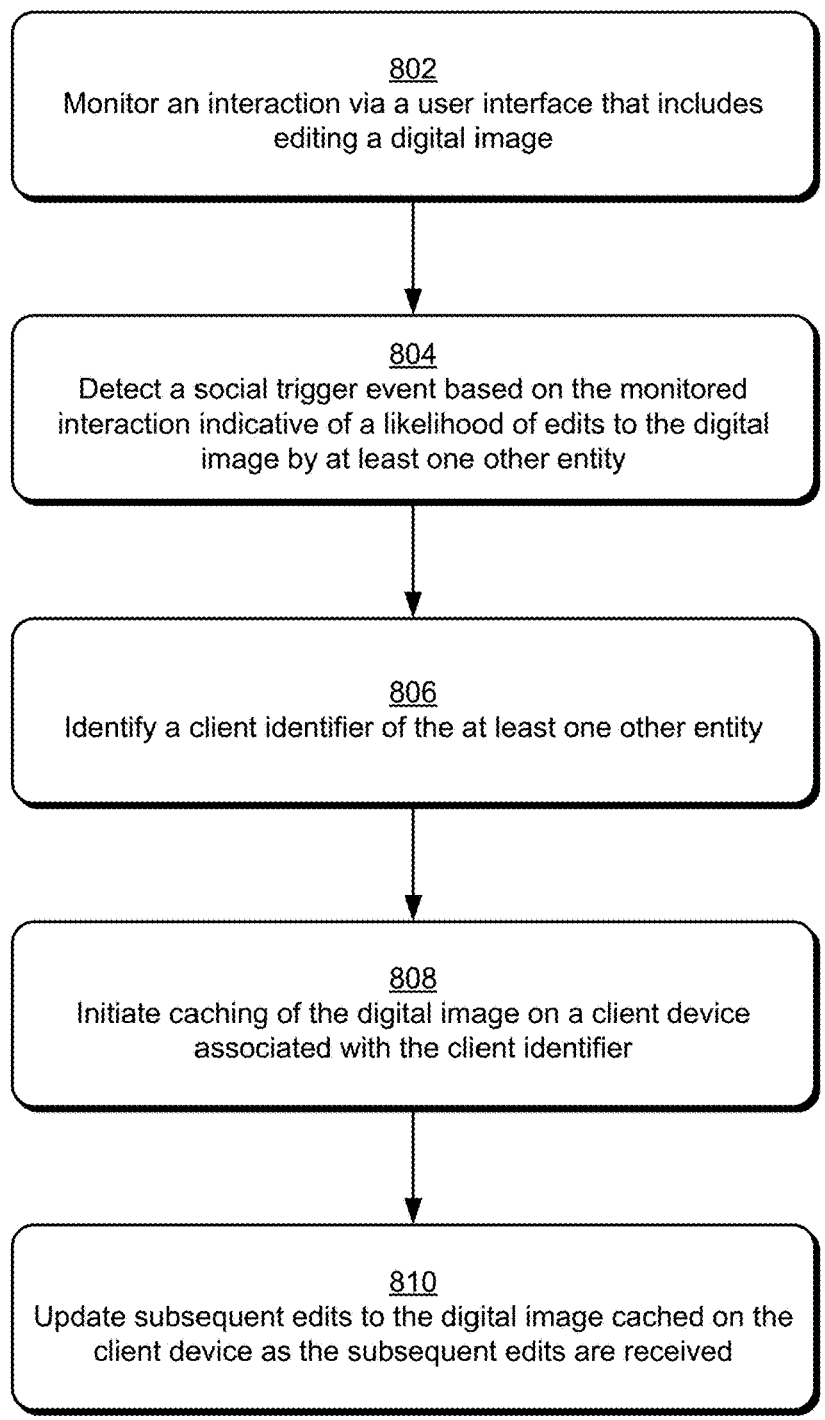
FIG. 8 depicts a procedure in an example implementation of trigger based digital content caching.

FIG. 8 depicts a procedure 800 in an example implementation of trigger based digital content caching. At 802, an interaction via a user interface of a processing device is monitored that includes editing a digital image. In various examples, the digital image is maintained as part of a digital service 110 by a service provider system 108 for cloud-based collaborative editing. In additional or alternative examples, the digital content is maintained locally by the processing device and/or as part of a cache system 118. Further, in some embodiments the monitoring includes monitoring operations of the processing device, properties of the processing device, and/or characteristics of the digital image.

At 804, a trigger event is detected based on the monitored interaction. In an example, the trigger event 224 is a social trigger event indicative of a likelihood of edits to the digital image by at least one other entity. In various examples, detection of the trigger event 224 is based on a variety of considerations such as features of the digital image, performance metrics associated with the interaction, operations of the processing device, metadata associated with the processing device, etc. For instance, the trigger event 224 includes one or more of operations of the processing device such as generation of an invitation to the at least one other entity, generation of a user tag including a client identifier associated with the at least one other entity (e.g., in a commenting pane of a cloud-based application), initialization of a centralized digital workspace, generation of invitations to the centralized digital workspace, performance of a share-for-review operation, detection of an embedded/linked digital image included in the digital image, etc.

At 806, a client identifier of the at least one other entity is identified. The client identifier, for instance, is usable to access the digital image for editing via the digital services 110. In various examples, the client identifier is associated with an organizational classifier that indicates a permission level to view and/or edit the digital image.

At 808, caching of the digital image is initiated on a client device associated with the client identifier. In various examples, caching is initiated automatically and without user intervention. The initiating also includes configuring the digital image, such as to be editable by the client device. In some implementations, the initiating further includes identifying a plurality of client devices associated with the client identifier, determining a primary client device of the plurality of client devices, and causing the digital image to be cached on the primary client device.

For instance, the primary device is determined based on usage data of the plurality of client devices, hardware capabilities of the plurality of client devices, user defined preferences, etc. In an example, the primary device is determined as a most recent client device of the plurality of computing devices to access a particular digital service 110, e.g., to edit a digital image. In another example, the primary client device is determined as having hardware capabilities that support efficient editing of the digital image. In yet another example, the primary client device is a frequently used client device based on usage data. Further, in some embodiments, determination of a primary client device includes determining that the primary client device is opted-in for automatic caching.

At 810, subsequent edits are updated to the digital image cached on the client device as subsequent edits are received. For instance, edits made by the processing device and/or the client device can be updated to the cached digital image. In some examples, this includes updating the cached digital image on either or both the processing device or the client device. In this way, automatic caching is performed dynamically to continuously update the digital content and enhance a user experience.

Figure 9:
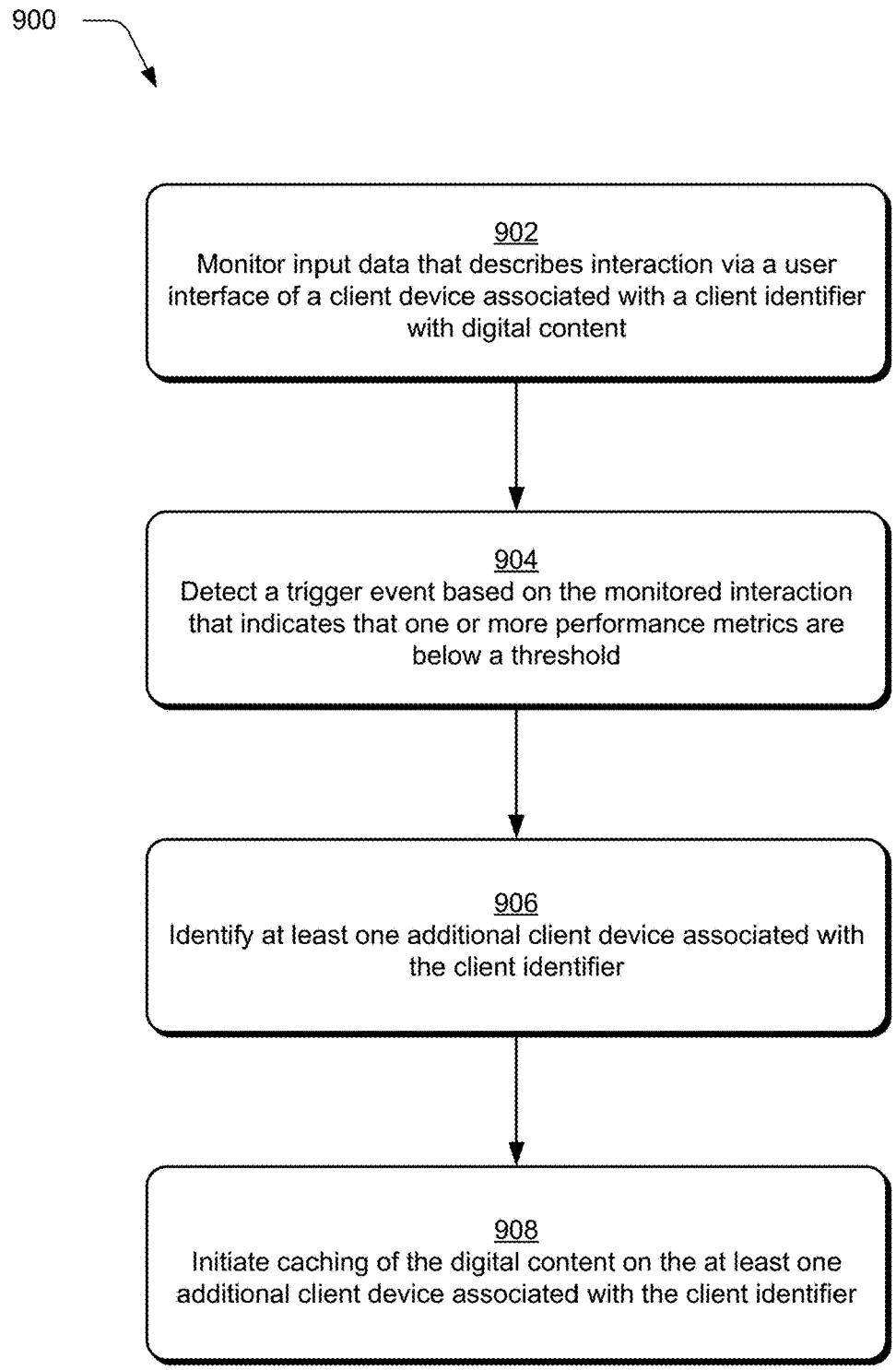
FIG. 9 depicts a procedure in an example implementation of trigger based digital content caching in which the trigger event is based on one or more performance metrics.

FIG. 9 depicts a procedure 900 in an example implementation of trigger based digital content caching in which the trigger event is based on one or more performance metrics. At 902, input data is monitored that describes interaction via a user interface of a client device associated with a client identifier with digital content. In various examples, the digital content 112 is maintained as part of a digital service 110 by a service provider system 108 for cloud-based collaborative editing. In additional or alternative examples, the digital content 112 is maintained locally by the processing device and/or as part of a cache system 118.

At 904, a trigger event is detected based on the monitored interaction that indicates that one or more performance metrics are below a threshold. Generally, the performance metrics indicate computational efficiency of the client device involved in the interaction. For instance, the performance metrics include one or more of a computational resource consumption metric (e.g., CPU, RAM, ROM use, etc.), network resource consumption, storage capacity, etc. In one example, the performance metrics include a reliability metric that describes successful execution of one or more operations performed by the client device to interact with the digital content 112, e.g., one or more create, read, update, or delete operations.

At 906, at least one additional client device associated with the client identifier is identified. In some examples, this further includes determining properties associated with the at least one additional client device, such as hardware capabilities, software versions, usage data, etc. At 908, caching of the digital content is initiated on the at least one additional client device associated with the client identifier, e.g., automatically and without user intervention. In an example, the initiating includes configuring the digital content 112 to be editable by the at least one additional client device. Further, in some examples caching is initiated on a plurality of additional client devices including the client device involved in the interaction, such that the digital content 112 is available for editing on a plurality of devices associated with the client identifier. In alternative or additional examples, caching is initiated on select devices, such as one or more primary devices that are determined to be reliable client devices unlikely to experience failed editing operations. In this way, digital content is cached automatically and without use intervention on a primary client device that has a reduced propensity to have operational failures.

Example System and Device

Figure 10:
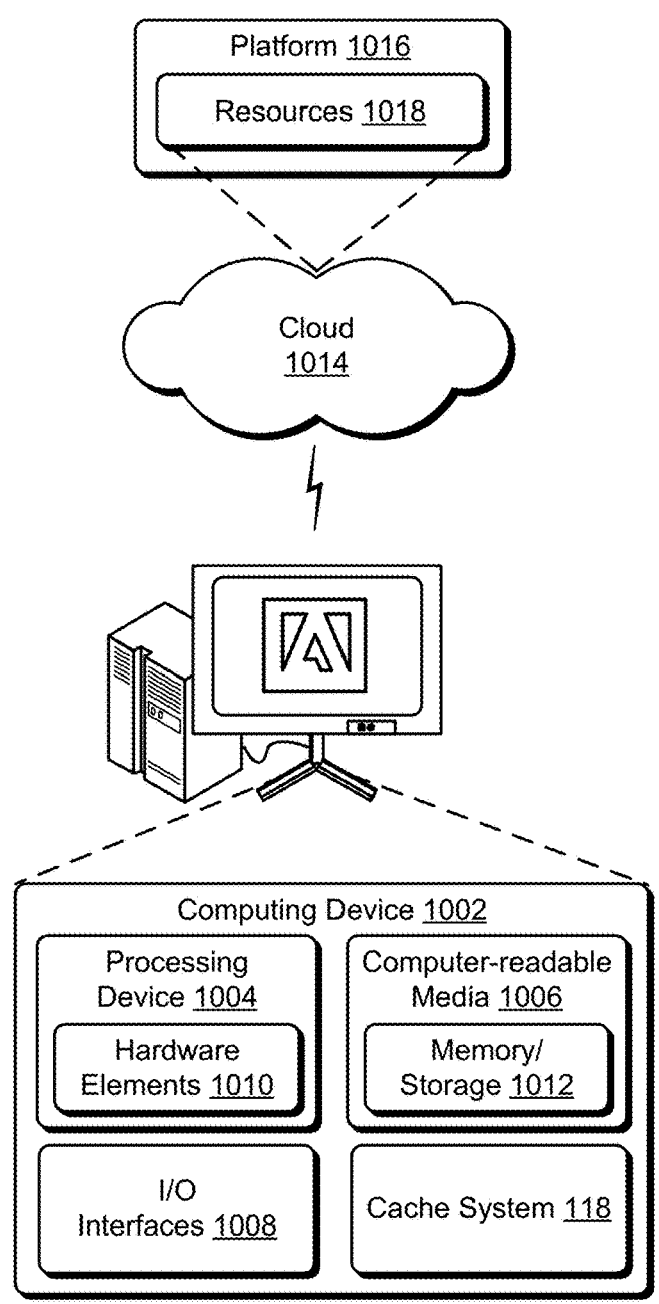
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the cache system 118. The computing device 1002 is configurable, for example, as a server of a service provider, a device associated with a client (e.g., a client device), an on-chip system, and/or any other suitable computing device or computing system.

The example computing device 1002 as illustrated includes a processing device 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1004 is representative of functionality to perform one or more operations using hardware. Accordingly, the processing device 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing device 1004. The instructions and/or functions are executable/operable by one or more articles of manufacture (for example, one or more computing devices 1002 and/or processing devices 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    monitoring, by a processing device, an interaction via a user interface that includes editing a digital image that is maintained as part of a digital service by a service provider system for cloud-based collaborative editing;
    detecting, by the processing device, a social trigger event based on the monitored interaction, the social trigger event indicative of a likelihood of edits to the digital image by at least one other entity;
    identifying, by the processing device, a client identifier of the at least one other entity, the client identifier usable to access the digital image for editing via the digital service; and
    initiating, by the processing device automatically and without user intervention, caching of the digital image on a client device associated with the client identifier, the initiating including configuring the digital image to be editable by the client device.

2. The method as described in claim 1, further comprising updating subsequent edits to the digital image cached on the client device as the subsequent edits are received.

3. The method as described in claim 1, wherein the social trigger event includes operations by the processing device including:
    generating an invitation to the at least one other entity to edit the digital image;
    activating a commenting pane of a cloud-based application provided by the service provider system; and
    generating a user tag in the commenting pane that includes the client identifier associated with the at least one other entity.

4. The method as described in claim 1, wherein the initiating includes:
    identifying, by the processing device, a plurality of client devices associated with the client identifier;
    determining, by the processing device, a primary client device of the plurality of client devices based on usage data of the plurality of client devices; and
    causing the digital image to be cached on the primary client device.

5. The method as described in claim 4, wherein the primary client device is determined based on hardware capabilities of the plurality of client devices.

6. The method as described in claim 4, wherein the initiating further includes determining that the primary client device is opted-in for automatic caching.

7. The method as described in claim 1, wherein the social trigger event includes operations by the processing device including:
    initializing a centralized digital workspace to enable collaborative editing of the digital image; and
    inviting the at least one other entity to join the centralized digital workspace to edit the digital image.

8. The method as described in claim 1, wherein the social trigger event includes operations by the processing device to perform a share-for-review operation to invite the at least one other entity to review the digital image and wherein the initiating includes detecting an organizational classifier associated with the client identifier that indicates that the at least one other entity is privileged to edit the digital image.

9. The method as described in claim 1, wherein the social trigger event includes detecting an embedded digital image included in the digital image and wherein the initiating further includes initiating caching of an editable version of the embedded digital image on the client device and on the processing device automatically and without user intervention.

10. A system comprising:
    a cache system implemented by one or more processing devices to perform operations including:
        monitoring an interaction of a first client device with digital content that is maintained as part of a digital service by a service provider system;
        detecting a social trigger event based on the monitored interaction, the social trigger event indicative of a likelihood of interaction by a second client device to edit the digital content; and initiating, automatically and without user intervention, caching of the digital content on the second client device based on detection of the social trigger event, the initiating including configuring the digital content to be editable by the second client device.

11. The system as described in claim 10, wherein the social trigger event includes operations by the first client device to:

invite the second client device to edit the digital content;

activate a commenting pane of a cloud-based application provided by the service provider system; and generate a user tag in the commenting pane that includes a user identifier associated with the second client device.

12. The system as described in claim 10, wherein the social trigger event includes operations by the first client device to initialize a centralized digital workspace to enable collaborative editing of the digital content and invite the second client device to join the centralized digital workspace to edit the digital content.

13. The system as described in claim 10, wherein the social trigger event includes operations by the first client device to perform a share-for-review operation to invite the second client device to review the digital content.

14. The system as described in claim 10, wherein the cache system is further implemented to perform operations including determining a user identifier associated with the second client device and detecting an organizational classifier associated with the user identifier that indicates that the second client device is privileged to edit the digital content, and wherein the initiating is responsive to detecting the organizational classifier.

15. The system as described in claim 10, wherein the initiating includes:

determining a user identifier associated with the second client device;

identifying a plurality of client devices associated with the user identifier;

determining a primary client device of the plurality of client devices based on usage data of the plurality of client devices; and causing the digital content to be cached on the primary client device.

16. The system as described in claim 15, wherein the primary client device is determined based on an indication from the usage data that the primary client device is a most recent device of the plurality of client devices to access the digital service of the service provider system.

17. The system as described in claim 10, wherein the cache system is further implemented to perform operations including detecting one or more performance metrics associated with the interaction between the first client device and the digital content, the one or more performance metrics indicating computational efficiency of the first client device, and wherein caching of the digital content is based in part on the one or more performance metrics.

18. A non-transitory computer-readable storage medium storing executable instructions, which when executed by a processing device, cause the processing device to perform operations comprising:

monitoring input data that describes interaction via a user interface of a client device associated with a client identifier with digital content that is maintained as part of a digital service by a service provider system;

detecting a trigger event based on the monitored interaction that indicates that one or more performance metrics are below a threshold, the one or more performance metrics indicating computational efficiency of the client device involved in the interaction;

identifying at least one additional client device associated with the client identifier; and initiating caching of the digital content on the at least one additional client device associated with the client identifier automatically and without user intervention, the initiating including configuring the digital content to be editable by the at least one additional client device.

19. The non-transitory computer-readable storage medium as described in claim 18, wherein the one or more performance metrics include a reliability metric based on successful execution of one or more operations performed by the client device to interact with the digital content.

20. The non-transitory computer-readable storage medium as described in claim 18, wherein the operations further include causing the digital content to be cached on the client device automatically and without user intervention in addition to the at least one additional client device.

* * * * *